US008745747B2

(12) United States Patent
Song et al.

(10) Patent No.: US 8,745,747 B2
(45) Date of Patent: Jun. 3, 2014

(54) DATA PROTECTING DEVICE

(75) Inventors: Zhexuan Song, Sunnyvale, CA (US);
Jesus Molina, Sunnyvale, CA (US);
Joseph Gordon, Sunnyvale, CA (US)

(73) Assignee: Fujitsu Limited, Kawasaki (JP)

(*) Notice: Subject to any disclaimer, the term of this patent is extended or adjusted under 35 U.S.C. 154(b) by 401 days.

(21) Appl. No.: 12/651,269

(22) Filed: Dec. 31, 2009

(65) Prior Publication Data

US 2011/0162076 A1 Jun. 30, 2011

(51) Int. Cl.
*H04L 29/06* (2006.01)
(52) U.S. Cl.
USPC .......................................................... 726/26
(58) Field of Classification Search
USPC .......................................................... 726/26
See application file for complete search history.

(56) References Cited

U.S. PATENT DOCUMENTS

| 8,417,217 | B2 | 4/2013 | Kasama |
| 2004/0019800 | A1* | 1/2004 | Tatebayashi et al. ......... 713/200 |
| 2004/0083373 | A1 | 4/2004 | Perkins et al. |
| 2004/0103288 | A1 | 5/2004 | Ziv et al. |
| 2004/0122940 | A1 | 6/2004 | Gibson et al. |
| 2004/0148385 | A1 | 7/2004 | Srinivasan et al. |
| 2005/0039046 | A1 | 2/2005 | Bardsley et al. |
| 2005/0221800 | A1* | 10/2005 | Jackson et al. ................ 455/411 |
| 2006/0015941 | A1 | 1/2006 | Mckenna |
| 2007/0260922 | A1 | 11/2007 | Cao et al. |
| 2007/0294770 | A1 | 12/2007 | Cuenod et al. |
| 2008/0016355 | A1* | 1/2008 | Beun et al. ..................... 713/172 |
| 2008/0107262 | A1 | 5/2008 | Helfman et al. |
| 2008/0263658 | A1* | 10/2008 | Michael et al. ................. 726/22 |
| 2008/0305770 | A1 | 12/2008 | Kasama |
| 2009/0122143 | A1 | 5/2009 | Latham et al. |
| 2010/0332744 | A1* | 12/2010 | Khosravi et al. .............. 711/112 |

FOREIGN PATENT DOCUMENTS

| CN | 1452076 A | 10/2003 |
| CN | 1998236 A | 7/2007 |
| JP | 2004-349902 | 12/2004 |
| JP | 2007-074707 | 3/2007 |
| JP | 2008-154080 | 7/2008 |
| JP | 2008-269232 | 11/2008 |

OTHER PUBLICATIONS

PCT International Search Report and Written Opinion of the International Searching Authority dated Oct. 12, 2010 in corresponding International Application No. PCT/US2010/046143 (7 pages).
International Preliminary Report on Patentability (Chapter I of PCT), issued Jul. 4, 2012, in corresponding International Patent Application No. PCT/US2010/046143 (6 pages).
Japanese Office Action mailed Nov. 12, 2013 in corresponding Japanese Patent Application No. 2012-547064 (5 pages) (3 pages English Translation).
First Chinese Office Action dated Feb. 28, 2014 in corresponding Chinese Patent Application No. 201080048543.0 (7 pages) (10 pages).
Chinese Search Report dated Feb. 19, 2014 in corresponding Chinese Patent Application No. 201080048543.0 (2 pages) (2 pages English Translation).

\* cited by examiner

*Primary Examiner* — Jason Gee
(74) *Attorney, Agent, or Firm* — Staas & Halsey LLP

(57) ABSTRACT

An event condition is checked, using a computer and data content of the computer is additionally protected in relation to a normal data protection according to the event condition. The event condition is detecting by the computer a remote command and/or detecting a state according to a policy.

15 Claims, 12 Drawing Sheets

DATA ACCESS PROTECTION SCENARIOS

| | SCENARIO A-1 | SCENARIO A-2 | SCENARIO A-3 | SCENARIO A-4 |
|---|---|---|---|---|
| TRIGGER | • TIME OF WORK OFFLINE EXCEEDED | • MULTIPLE TIMES OF CONNECTING TO UNAUTHORIZED PC<br><br>• CONSECUTIVE FAILURES ABOUT USER AUTHENTICATION | • DEVICE RECEIVED A DESTRUCTION COMMAND | • DEVICE NOT REPORTING STATE USING WIRELESS INTERFACE<br><br>• PHYSICAL TAMPERING |
| ACTION: DATA DESTRUCTION | • OVERWRITE OF ENCRYPTION KEY<br><br>• OVERWRITE ALL DATA | • OVERWRITE OF ENCRYPTION KEY<br><br>• OVERWRITE ALL DATA | • OVERWRITE OF ENCRYPTION KEY<br><br>• OVERWRITE ALL DATA | • OVERWRITE OF ENCRYPTION KEY<br><br>• OVERWRITE ALL DATA |
| REPORT | • USER WARNING BEFORE ERASING | • REPORT TO SERVER ONLY WHEN PLUGGED | • REPORT TO SERVER DIRECTLY | • REPORT TO SERVER DIRECTLY |

FIG. 4

SCENARIOS AND DEVICE FUNCTIONS

| | FEATURE | SCENARIOS | EXAMPLE OF MECHANISM(S) TO REALIZE FEATURE IN DEVICE, FOR EXAMPLE, A USB DEVICE |
|---|---|---|---|
| TRIGGER | TIME OF WORK OFFLINE EXCEEDED | A-1 | CLOCK FOR TIME |
| | CONSECUTIVE FAILURES ABOUT USER AUTHENTICATION | A-2 | COUNT UP MECHANISM FOR FAILURES AND RESET MECHANISM |
| | MULTIPLE TIMES OF CONNECTING TO UNAUTHORIZED PC | A-2 | A) CHECK MECHANISM WHETHER PC HAVE PASSWORD OR NOT (HMAC, NONCE) B) CHECK MECHANISM WHETHER PC HAVE CERTIFICATE OR NOT (SIGNATURE VERIFICATION, RNG) C) CHECK MECHANISM WHETHER PC HAVE AUTHORIZED SOFTWARE OR NOT (SIGNATURE VERIFICATION, RNG, WHITELIST) |
| | USB RECEIVED A DESTRUCTION COMMAND | A-3 | USB HAVE RECEIVE MECHANISM FROM SERVER DIRECTLY AT CERTAIN SPECIFIED INTERVAL |
| | USB NOT REPORTING STATE USING WIRELESS INTERFACE | A-4 | USB HAVE MECHANISM THAT COMMUNICATE WITH SERVER AT CERTAIN SPECIFIED INTERVAL |
| | PHYSICAL TAMPER | A-4 | USB CASE OR CIRCUIT IS TAMPER RESISTANCE, SENSE PHYSICAL TAMPERING |
| ACTION: DATA DESTRUCTION | OVERWRITE OF ENCRYPTION KEY | ALL | A) DATA IS ENCRYPTED, AND USB HAVE OVERWRITING MECHANISM OF ENCRYPTION KEY B) DATA IS ENCRYPTED, AND USB HAVE OVERWRITING MECHANISM OF ENCRYPTION KEY. DATA BLOCK OF ENCRYPTION KEY IS LOST IF BATTERY LOST, OR CONTROLLER IS BROKEN. |
| | OVERWRITE ALL DATA | ALL | A) DATA IS ENCRYPTED, AND USB HAVE OVERWRITING MECHANISM OF ALL DATA B) DATA IS ENCRYPTED, AND USB HAVE OVERWRITING MECHANISM OF ALL DATA. DATA BLOCK IS LOST IF BATTERY LOST, OR CONTROLLER WAS BROKEN. |
| REPORT | USER WARNING BEFORE ERASING | ALL | USB HAVE LED, SOUND FUNCTION THAT SHOW THE WARNING BEFORE DESTRUCTION |
| | REPORT TO SERVER ONLY WHEN PLUGGED | A-2 | USB HAVE SENDING MECHANISM FROM DEVICE TO SERVER WHEN USB IS PLUG-IN TO UNAUTHORIZED PC |
| | REPORT TO SERVER DIRECTLY | A-3,4 | USB HAVE SENDING MECHANISM, FROM DEVICE TO SERVER. SENDING MECHANISM HAVE BATTERY FOR SEND COMMAND. |

FIG. 6

DATA PROTECTING DEVICE

FIELD

The embodiments discussed herein relate to data protection.

BACKGROUND

Currently, computing devices (computers), and in particular, for example, small portable or mobile computing devices, such as USB memory stick, are widely used to store data, for example, personal and/or company sensitive data. As users move around with these kind of devices, comparing to laptops, these kind of devices is easier to be lost or stolen. When a device is lost or stolen, the data, such as the personal and/or company sensitive data, can be leaked to or accessed by unauthorized parties, which may lead to unnecessary damages for the person and/or the company the person works for.

SUMMARY

According to the embodiments of the invention, methods, apparatuses and/or computer readable media that are installable or can be implemented or can be caused to be executed in computing devices (hereinafter also referred to as a device) for protecting data from an unauthorized user are described. According to an aspect of an embodiment, the data on a computing device is destructed (for example, data erased, memory destroyed) and/or made inaccessible (for example, encrypted), after certain conditions (e.g. the device is reported lost or stolen) are met. Optionally, a verifiable status report will be sent to a server for a record.

An example embodiment allows a portable computing device (such as USB memory stick) to destruct its data content while certain conditions have been met (such as lost or stolen or being requested by a server, or any combinations thereof). According to another aspect of an embodiment, since in most cases, a device might be out of reach of authorized users, the destruction procedure must be done automatically. An example advantage of an embodiment of the invention is that certain described methods make it very difficult for attackers to prevent protection of the data, for example, to prevent the data from being destructed. Therefore potential data leakage can be substantially avoided. And other described methods can have very low requirements to fulfill the data protection job automatically.

It is to be understood that both the foregoing general description and the following detailed description are exemplary and explanatory and are not restrictive of the invention, as claimed.

BRIEF DESCRIPTION OF DRAWINGS

FIG. 4 is a table of data access protection scenarios, according to an embodiment of the invention.

FIG. 6 is a table of data access protection scenarios and computing device functions, according to embodiments of the invention.

DETAILED DESCRIPTION OF EMBODIMENT(S)

According to embodiments of the invention, methods, apparatuses and/or computer readable media that are installable or can be implemented or can be caused to be executed in computing devices (hereinafter also referred to as a device) for protecting data from an unauthorized user are described. According to an aspect of an embodiment, the data is sensitive data, such as personal information, restricted data according to a policy, or any combination thereof. According to an aspect of an embodiment, access to data is controlled, for example, data is protected from unauthorized access or limited to authorized access, depending upon or according to occurrence of one or more event condition. According to an aspect of an embodiment, the data on a computing device is destructed (for example, data erased, memory destroyed) and/or made inaccessible (for example, encrypted) after certain conditions (e.g. the device is reported lost or stolen) are met to meet a data protection or data access policy. A data protection or data access policy can be set by any entity, for example, a company (rules or regulations), a government (e.g., laws, rules/regulations) or a person.

According to an embodiment, as a computing device with data access protection according to an event condition (occurrence of a trigger event), a portable Universal Serial Bus (USB) device, such as a USB memory stick, is described, however, the present invention is not limited to a USB memory stick, but any computing device can embody the embodiments of the invention. For example, a mobile phone or other portable/mobile/handheld devices can be a computing device. Inside a device (e.g. USB memory stick), a destruction component (hardware or software) is installed. The function of the component is to destruct the contents on the device.

Figure 1:
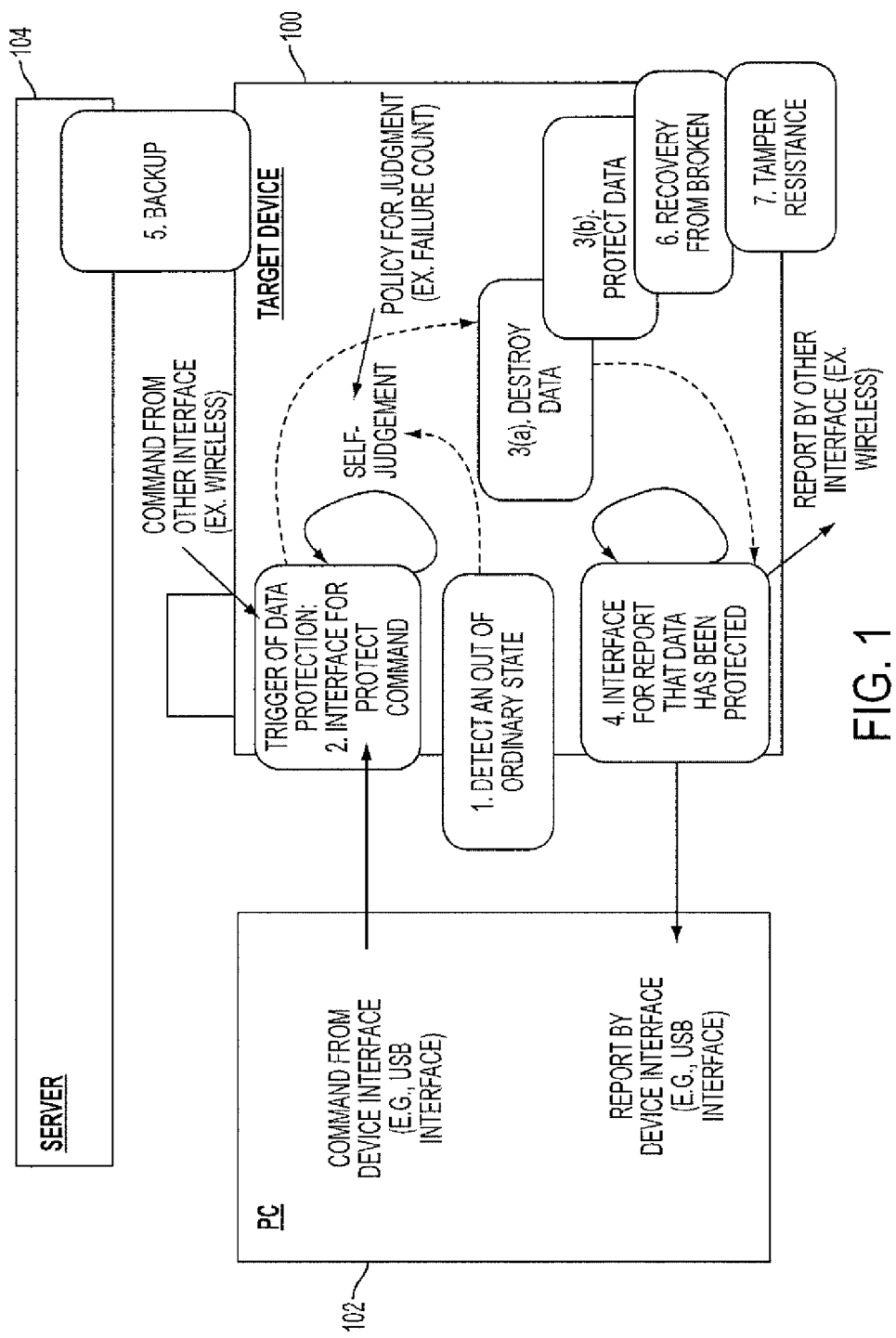
FIG. 1 is a functional block diagram of a computing device according to an embodiment of the invention.

FIG. 1 is a functional block diagram of a computing device according to an embodiment of the invention. In FIG. 1, a target computer/device 100 whose data content is to be protected, for example, by data destruction. For example, a USB device 100 as a destructible device, is communicably connectable by one or more device interfaces, such as the USB interface and/or wireless interface, to another computing device, such as the personal computer (PC) 102 and to a server 104, also referred to as a remote or external device in relation to the target device 100. According to an aspect of an embodiment, the destructible device is configurable to execute a virtual machine (VM).

According to an embodiment, access to data is controlled in addition to normal access control on a computer by checking for an event condition, using a computer; and additionally protecting data content in relation to a normal data protection on the computer according to the event condition according to the event condition. For example, in FIG. 1, the device 100 can perform at 1 a self judgment logic according to a policy for additionally (at higher level) controlling access to the data and/or at 2 detect an additional (higher level) data access control (data protection) command via one or more of the device interfaces, such as a USB interface and/or a wireless interface, as a bypass logic 2. The device 100 at 3 can take one or more additional access control actions according to determination(s) at 1 and/or 2, for example, at 3(*a*) destroy data and/or at 3(*b*) take additional control action to protect the data from possible unauthorized access.

In addition, the device 100 at 4 can report via device interface by notifying a state of the data protection, such as a report that the data has been destroyed. The report can be to the remote device 102 and/or 104 and/or to a user of the device 100. The device 100 can include a backup function 5 to backup of data content according to application criteria/policy and/or a recovery function 6 to recover from an additional access control to data. The device 100 can include a tamper resistance function 7 that triggers an event condition, for example, upon detecting unauthorized tampering with hardware and/or software components of device 100, which in turn triggers additional data protection.

Figure 2A:
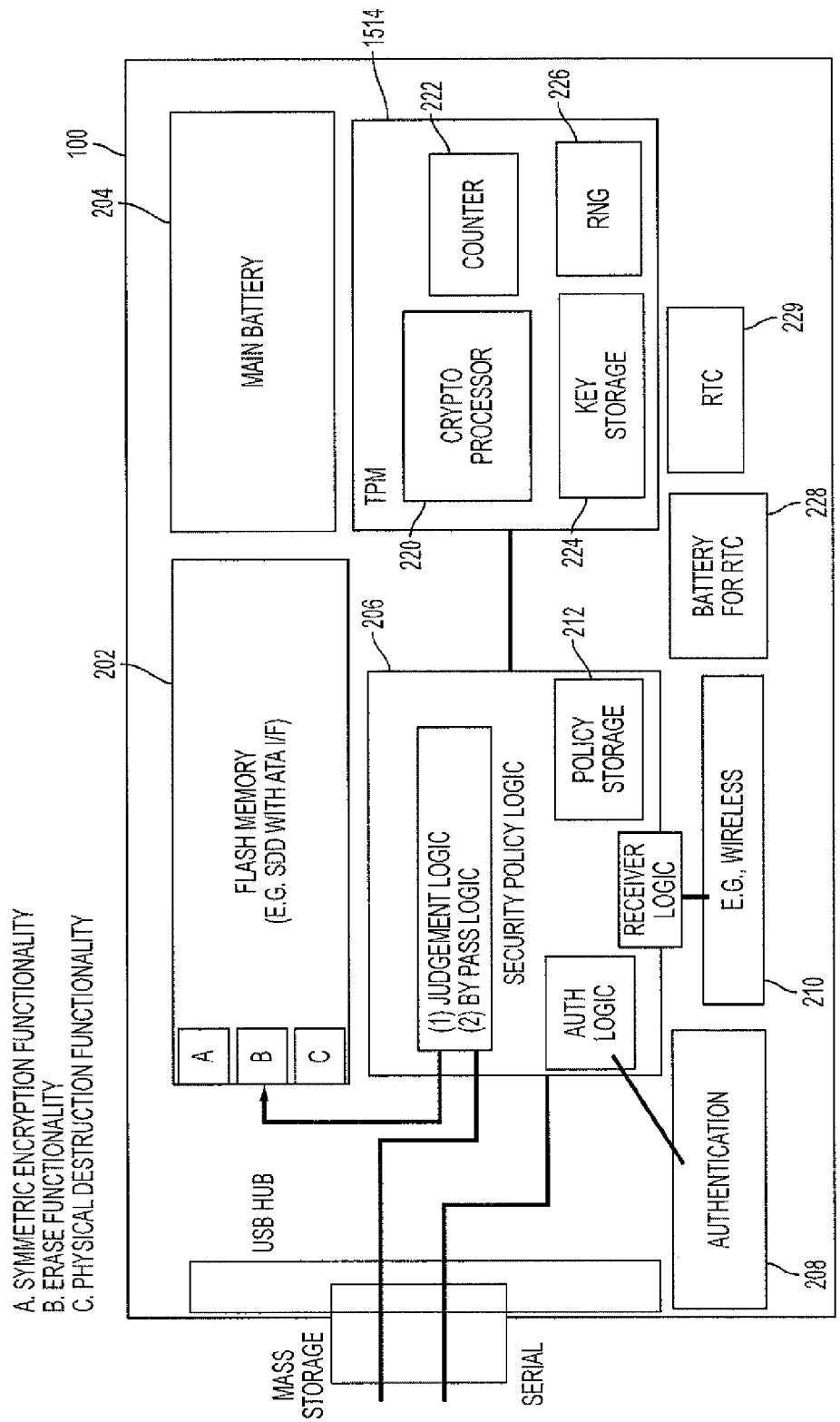
FIGS. 2A and 2B are block diagrams of computing devices according to embodiments of the invention.
Figure 2B:
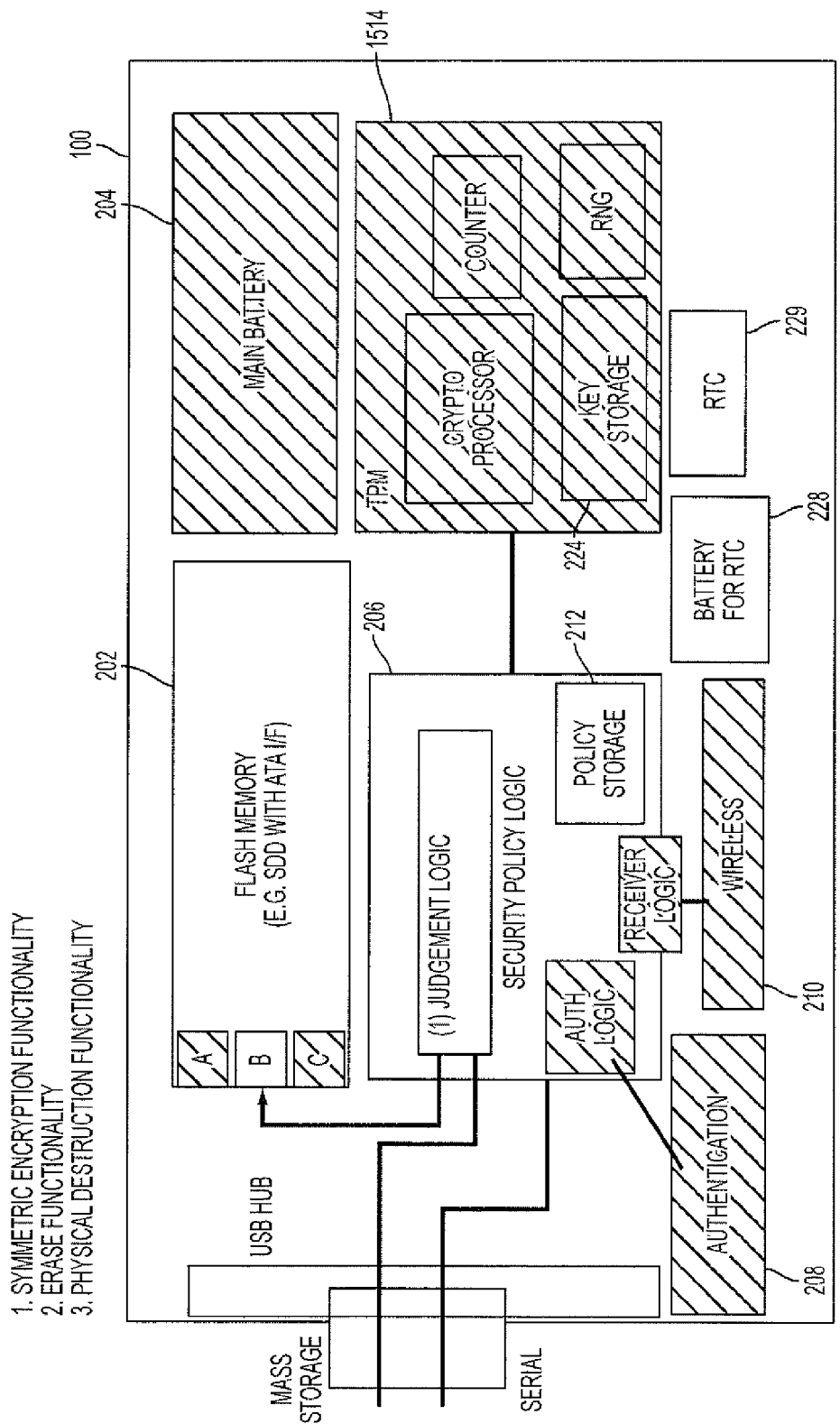

FIGS. 2A and 2B are block diagrams of computing devices according to embodiments of the invention. In FIG. 2A, the device 100 includes one or more functionalities, such as symmetric encryption functionality, erase functionality or physical destruction functionality. The functionalities can be hardware and/or software components. The functionalities can be implemented in software and/or controllable by software and stored in computer readable recording media, such as flash memory 202. The device 100 can include a main battery 204, and a computer processor 206 or similar processing capability that executes security policy logic. The security policy logic can be judgment logic 1 and/or bypass logic 2 for determining whether additional protection of data content is needed. The security policy logic can further include one or more of authentication logic 208, security logic transceiver 210 and/or a security policy storage 212 (e.g., BIOS, ROM, etc.) The authentication logic 208 can be logic for remote authentication of the device 100 from outside of the device 100, failure of which could be an event condition to trigger additional data protection actions. The security logic transceiver 210 can transmit and receive information relating to security policies according to which additional data protection actions can be triggered. In addition, the security policy storage 212 can also store information relating to security policies, for example, in a ROM. BIOS or etc. other than the flash memory 202 that are tamper resistant. However, security polices can also be stored in the flash memory 202 and, for example, accessible only on authorized basis according to application criteria or security policy. The device 100 can have a display to display information.

The device 100 can also include a Trusted Platform Module (TPM) 1514 that includes one or more of a crypto processor 220, a counter 222, a key storage 224 and/or a random number generator (RNG) 226. The device 100 can also include a real-time clock (RTC) 228 and/or a battery 229 for the RTC (as the case may be).

FIG. 2B is a block diagram of a device 100' in which only a judgment logic 1 is provided, such that the bypass logic 2 is omitted. In FIG. 2B, other omitted components can be main battery 204, TMP 1514, authentication logic 208 and transceiver logic 210 can be omitted. Instead of the main batter 204, another second battery 228 that provides power, for example, solely, to the RTC and related timer logic (as described below) can be provided. According to an aspect of an embodiment, power according to USB specification may be used as available, for example, when a target USB device 100 is connected to a remote device 102 and/or 104.

Scenarios or examples of event conditions that trigger additionally protecting data content in relation to a normal data protection on the computer are described.

For example, as the bypass logic 2, a wireless module is installed in the device 100 (e.g. cellular module). The wireless module can communicate to a server 104 constantly (e.g., continuously, or at random, or at fixed time intervals, or any combinations thereof). Once the device 100 receives a destruction command, it will turn on the destruction component on the device 100.

In case of data protection by destruction, some examples of the destruction components in a computer system that includes the destructible device 100 include:

Hardware: a component, for example, the PC 102 and/or server 104, to send signals to a self-destructible chip in the target device 100 that stores the content;

Hardware: a component that holds material, for example, chemical material, which will destruct the target device 100 once the chemical material released;

Software: a piece of program that will delete all the contents on the device once being invoked.

According to an embodiment, a mechanism is provided to turn on the destruction component on the device 100, when, as in most cases, the device 100 is already out of reach (lost or stolen or not in remote communication) of authorized persons.

Possible drawbacks could be the device 100 might need a lot of battery power to support constant communication; it needs wireless communication time if a cell network is used, which could be expensive; it could be unreliable since attackers may remove the battery 204 from the device 100 or hide the device in a location where wireless network become unavailable. In these circumstances, the device 100 will not receive the destruction command correctly and the destruction component will not be turned on.

One additional improvement provides in the device 100, a function, which maps a timestamp from the RTC 229 to a binary message, has been defined beforehand. A remote computer, such as the PC 102 and/or the server 104 is also aware of the function. One example of such functions is a SHA1 hash function. Instead of being always on, a security check point that checks in or waits for a check via, for example, the wireless module 210 will only be activated once every certain time period (random and/or predetermined time intervals). Optionally, the wait time between two consecutive activation times should be random so that attackers cannot guess what the next activation time is. According to an embodiment, random activation of the security checkpoint in the device 100 can be synchronized with the remote device 102 and/or 104. During the activation time, the security policy logic 206 will wait for a message from the remote device. The message from the remote device is encrypted, for example, by a remote server private key where the corresponding public key is known to the device 100. The message can include a unique ID about the device 100, the current time, the output of the pre-defined function using the current time, and a data protection function (e.g., command, flag states, notice, etc.), for example, a YES/NO flag, for activating additional data protection, for example, data destruction. Once the device 100 receives the message, the device 100 can decrypt the message using the known public key, check the unique ID (if the unique ID is not about the device, ignore the message and/or take other data protection related action) and check the binary output of the pre-defined function, one or more of which serve as authentication of the remote device as well as a remote data access control command. If the device 100 cannot be activated, or the device 100 cannot receive the message from the remote device within a time limit, or the device 100 cannot decrypt the message, or the device 100 cannot verify the binary message from the time stamp, or based upon an combinations thereof, it can be counted, for example, as one NG. For example, in case of data destruction as a form of data protection, under the following one or more conditions the destruction component will be turned on: 1) the server sets YES flag for destruction; or 2) the device has consecutive n NGs, where n is predefined. According to an aspect of an embodiment, once the destruction component is turned on and fulfilled its job, the device 100 can continuously send a "destructed" message back to the remote device, until one or more 1) battery 204 and/or 228 is/are used up; or 2) an acknowledge message is received from the remote device.

Figure 3:
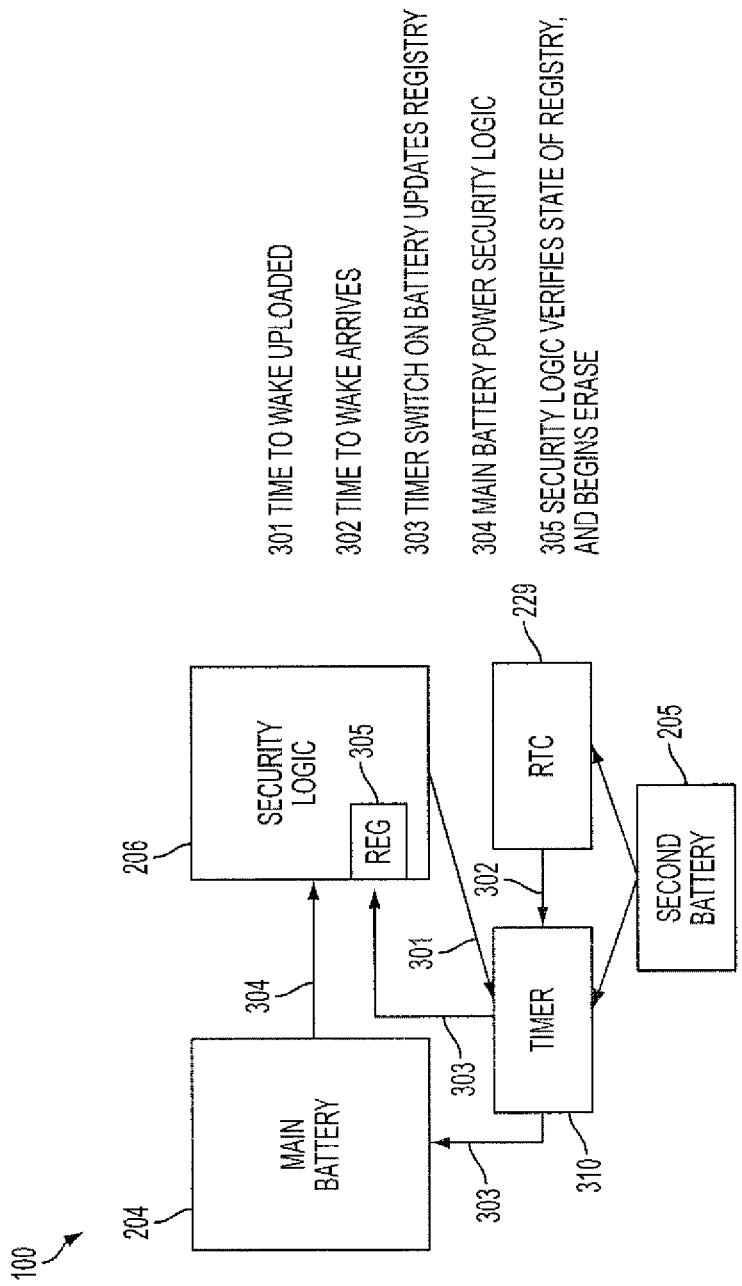
FIG. 3 is a functional block diagram for a computing device according to an embodiment of the invention.

FIG. 3 is a functional block diagram for a computing device according to an embodiment of the invention. For example, FIG. 3 is an example control flow. In FIG. 3, at 301, a security timer 310 that manages a time to awake is activated for execution by the security policy logic 206. At 302, the wake time arrives according to the RTC 229. At 303, the timer 310 switches on battery (as the case may be) and updates a registry. At 304, the security policy logic 206 is activated, for example, by receiving power from the main battery 204. At 305, the security policy logic 206 verifies a state of the registry and begins data protection, for example, erasing target data.

The state of the registry can be according to one or more event conditions, including an elapsed time, receipt of a remote data protection control message, user authentication failure, device 100 authentication failure, or any combinations thereof. In addition, occurrence of an event conditions is settable by one or more of predetermination, according to a policy, or dynamically and/or real-time configurable, or any combinations thereof.

According an embodiment, when a device 100 is not in communication with another remote computer, for example, upon detecting a USB device 100 is unplugged from a computer, a counter 310 in the USB device 100 using the RTC 229 counts down for a period of time or waits for a wake time, upon expiration of which or arrival of wake time an additional data protection is activated in the USB device 100.

According to an embodiment, the device 100 and/or target data of the device 100 has a life by activating independently of any check-in with a remote computer a counter 310 in the device 100 (e.g., a USB device 100) using the RTC 229. The counter 310 counts down for a period of time or waits for a wake time, upon expiration of which or arrival of wake time an additional data protection is activated in the USB device 100. The life can be extended be providing additional authorization by user interface and/or by communication with a remote computer.

FIG. 4 is a table of data access protection scenarios, according to an embodiment of the invention. In FIG. 4, table 400 provides examples of data access protection triggers, actions corresponding to the triggers and possible reporting. A trigger includes time of operation of the device 100. Or whether an amount of time the device 100 can operate without performing a security check-in with a remote device 102 and/or 104 has been exceeded, for example, amount of time working by accessing the target data while offline (communicably disconnecting) from a server 104, which is an event condition depending on amount of time the device 100 is server offline without checking in with the server 104. The target device 100 can security check-in with a plurality of remove devices. Another trigger includes number of times of connecting to an unauthorized remote device, or number of device 100 user authentication failures (for example, consecutive failures). An embodiment includes operating at the computer 100 and/or at the remote computer 102, 104 a virtual machine and measuring the virtual machine of the computer (i.e., self judgment) and/or the remote computer for verification of authorized computer 100 and/or remote device 102 and/or 104 as a trigger. Another device 100 security state self judgment can be whether there is a failure (invalid, expired, non-existing, etc.) in a certificate for the machine (any information that can verify a machine, private/public key, document, etc.).

A measurement refers to a fixed-length digital representation of an input data sequence of any length. A measurement can be, for example, a digital representation of whole and/or portion(s) of an operating environment (e.g., OS, data in computer readable media (memory, hard disk, etc.), data about configured peripherals/devices) and/or of files (e.g., files of software applications, data files) of a target machine, or in case of a VM an input virtual machine (VM) image including any VM hard disk and/or memory image, and/or files (e.g., files of software application, data files) of any VM on the target computing device, and used for verifying the target machine or target VM of the target machine as a 'trust state' of the target machine and/or target VM, for example, by comparison against another measurement(s) to detect any changes in the target machine and/or in the target VM in the target machine.

Another trigger is the device 100 receiving a data protection, such as a data destruction command. Another trigger is when the device 100 cannot report its security state to a remote device 102 and/or 104 and/or detecting physical tempering of the device 100.

In FIG. 4, an example data protection action corresponding to a triggered event condition is to cause the device 100 to invalidate an encryption key used to access data of the device 100, thereby preventing the device 100 from accessing the data. According to an embodiment an encryption key can be invalided by overwriting, erasing/deleting, or change of parameters generating the key.

Figure 5:
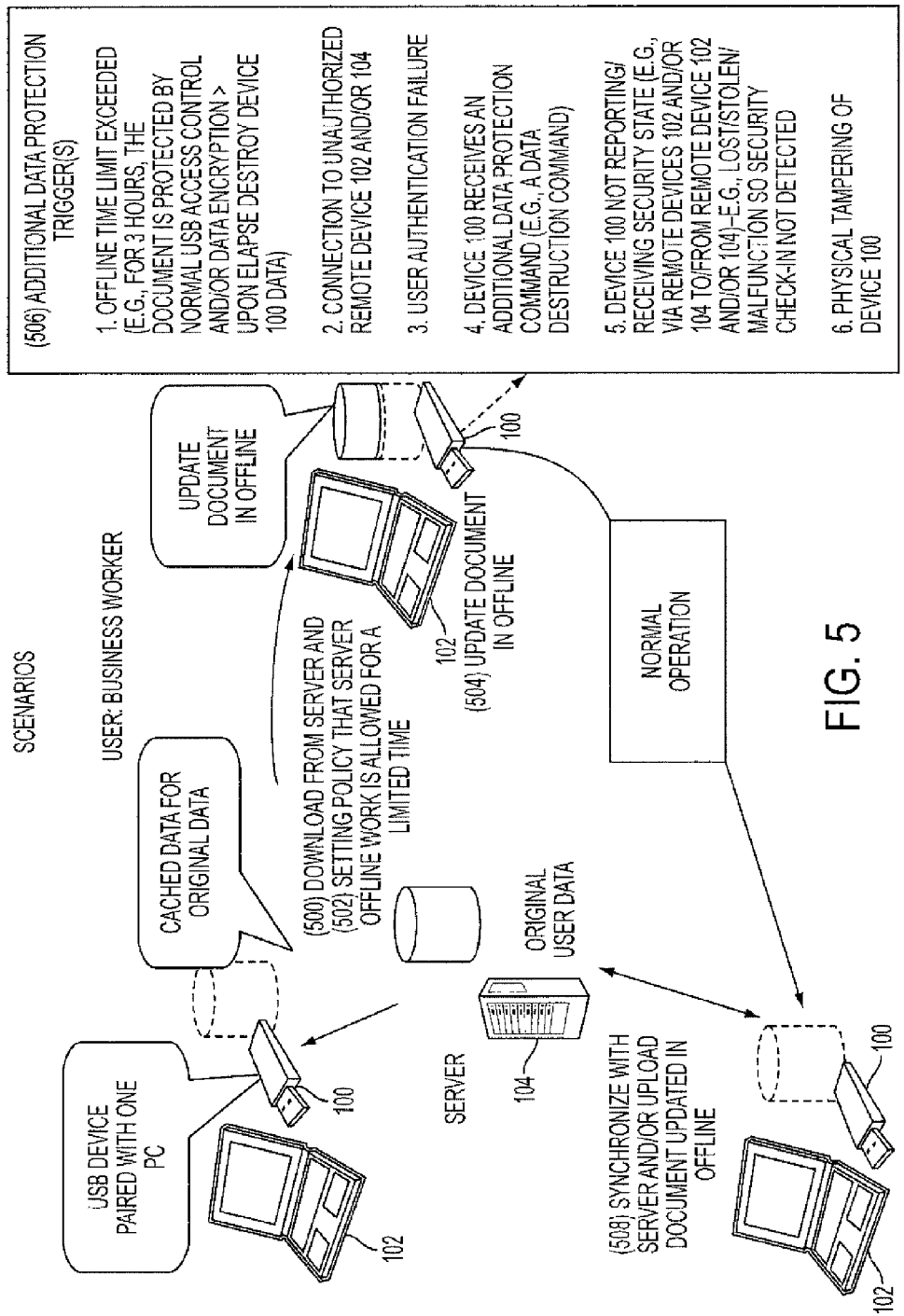
FIG. 5 is a flow diagram of data access protection scenarios in computer systems, according to embodiments of the invention.

FIG. 5 is a flow diagram of data access protection scenarios in computer systems, according to embodiments of the invention. FIG. 5 illustrates the flows of scenarios of table 400 including examples of triggers for additional data protection. According to an aspect of an embodiment, any combinations of one or more of the additional data protection triggers and in any sequence (or order) can be provided. For example, at 500, data content (e.g., documents, databases, etc.) may be downloaded from a server 104 to the target device 100. At 502, a policy can be set that offline work from the server 104 is allowed/permitted for a certain period of time, for example, 3 hours. Another policy item can be that the target device 100 must be paired with one or more other remote devices, for example, the portable personal computer 102, as one or more authorized remote devices. Thus, the policy can be a combination of one or more security policy items. At 504, a user can work with (e.g., edit, update, etc.) the downloaded data content offline, for example, with a paired authorized remote device 102.

At 506, the device 100 monitors for additional data protection triggers as event conditions. For example, the device 100 monitors whether the offline time limit has exceeded, where for the set time period the document is protected by normal security measures of USB access control and/or data encryption, and upon elapse of the set time period, the device 100 activates additional data content protection measures, for example, by making data inaccessible, for example, by destroying the data content, and/or to extend offline access by requiring a security check-in with and/or by the remote devices 102 and/or 104, and/or by the user. The security check-in can be to verify whether the data content should still be accessible, whether the device 100 can communicate with the remote devices 102 and/or 104, whether the user can be authenticated, or whether obtaining and/or applying new data encryption, or any combinations thereof.

In addition, at 506, the device 100 can monitor whether there is a connection to an unauthorized remote device 102 and/or 104 as a security event condition. At 506, user authentication failure can be a security event condition. At 506, the device 100 can receive an additional data protection command (e.g., a data destruction command) from a remote device. At 506, the device 100 can monitor whether reporting/receiving security state (e.g., via remote devices 102 and/or 104 to/from remote device 102 and/or 104) by the device 100 is possible or has failed. At 506, the device 100 can monitor whether there is any physical tampering of device 100, for example, tempering of the TPM 1514. According to an aspect of an embodiment, security related failures can be accumulated in a history until a condition to activate additional data protection is reached.

At 506, the device 100 monitors for security event conditions according to polic(ies) and additionally protects data of the device 100 in relation to a normal data protection on the device 100, according to the event security conditions. At 508, the device 100 performs normal activities, such as synchronize with the server 104, for example, to extend and/or to maintain the set time period of offline work, or upload document worked (e.g., updated) offline, or any combinations thereof.

FIG. 6 is a table of data access protection scenarios and computing device functions, according to embodiments of the invention. In FIG. 6, table 600 lists example components of the device 100 to implement the triggers, actions and reports.

FIGS. 7-10 are data flow diagrams of computer systems according to embodiments of the invention.

According to an embodiment, the device 100 can send the remote device 102 and/or 104 a message at the beginning of each time window ($t_w$). And the device 100 can also send asynchronous messages to a remote device, for example, when the device 100 may trigger a call for destruction not related by time, but, for example, because the device 100 is plugged to an unauthorized machine, for example, determined by a failure in a certificate for the machine (any information that can verify a machine, private/public key, document, etc.), and/or verification of a measurement of a virtual machine of the plugged to machine.

By sending messages at the beginning of each ON time window, tight synchronization might not be necessary between the remote device 102 and/or 104 and the device 100, as the remote device 102 and/or 104 will know when the device 100 is ready to receive messages. However the remote device 102 and/or 104 should still expect messages from the device 100 on specific time lapses, and react if these messages are not received timely.

Figure 7:
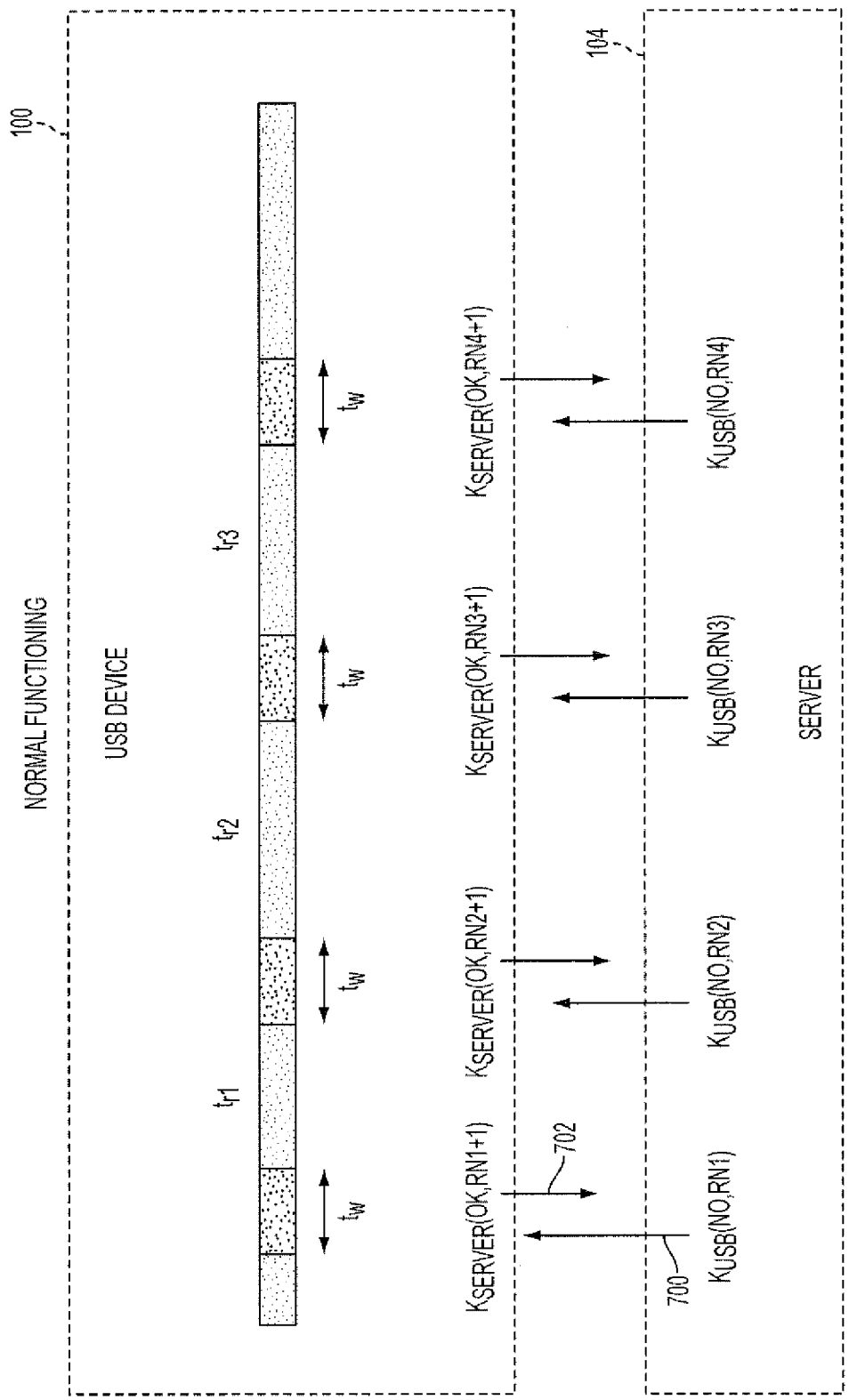
FIGS. 7-10 are data flow diagrams of computer systems according to embodiments of the invention.

FIG. 7 is a data flow diagram between a target device 100, which is for example, a USB device, and a server 104 as a remote device to the USB device 100. In FIG. 7, in normal functioning, at each time window $t_w$, the server 104 sends an encrypted message K to the USB device 100. Any encrypted messaging protocol can be used. In addition, the USB device can include TPM 1514 for managing encryption, including the keys. In case of using public/private keys, the USB device 100 accesses the public key of the server 104 to decrypt the message K. In addition, for synchronization, each message from the server includes a random number RNn (where n is any number). The random number is changed according to a policy to maintain a sequence and verified by both the USB device 100 and the server 104. In FIG. 7, at 700, the server 104, during a time window $t_w$, sends a message K including an additional data protection function information and RN1. At 700, the data protection function is a 'NO' command indicating additional data protection is not activated or disabled. At 702, the USB device 100 receives the message K (NO, RN1) from the server 104, decrypts the message using the public key of the server 104 and sends an acknowledgement message K(OK, RN1+1) back to the server 104. The USB device 100 message at 702 includes the command 'OK' indicating that security state of the USB device 100 is normal. Then RN1+1 is the next number after the random number RN1 to be expected by the server 104.

In FIG. 7, the server messages and USB device return messages are continuously exchanged until there is a break in one or more of a sequence in the random numbers or in receiving a message by either device 102 and/or 104. According to an embodiment, either or both devices can maintain a count of a number of failures in time window to accumulate a history of the failures, and a security event condition is triggered when the number of failures reaches a condition. A benefit is that some failures to exchange messages K in one or more time windows (e.g., message received/transmitted outside of a time window, message transmission or reception failure, etc.) can be tolerated prior to triggering a security event condition. In addition, a mechanism can be provided to reset the failure count, for example, after a certain number of successful message K exchanges, by user input, or by remote device command, or any combinations thereof.

According to an aspect of an embodiment, the time window is a window of time (period of time) during which the device 100 and a remote device 102 and/or 104 expect to transceive a message. The time window indicates that each device will be alive for a period of time to conduct a security related transaction. The duration of a time window is adjustable according to a policy, the longer the time window, the less important message synchronization between the devices and more power usage; and the shorter the time window, the more important message synchronization between the devices, which increases sensitivity of a trigger based upon message receipt failure, and less power usage.

Figure 8:
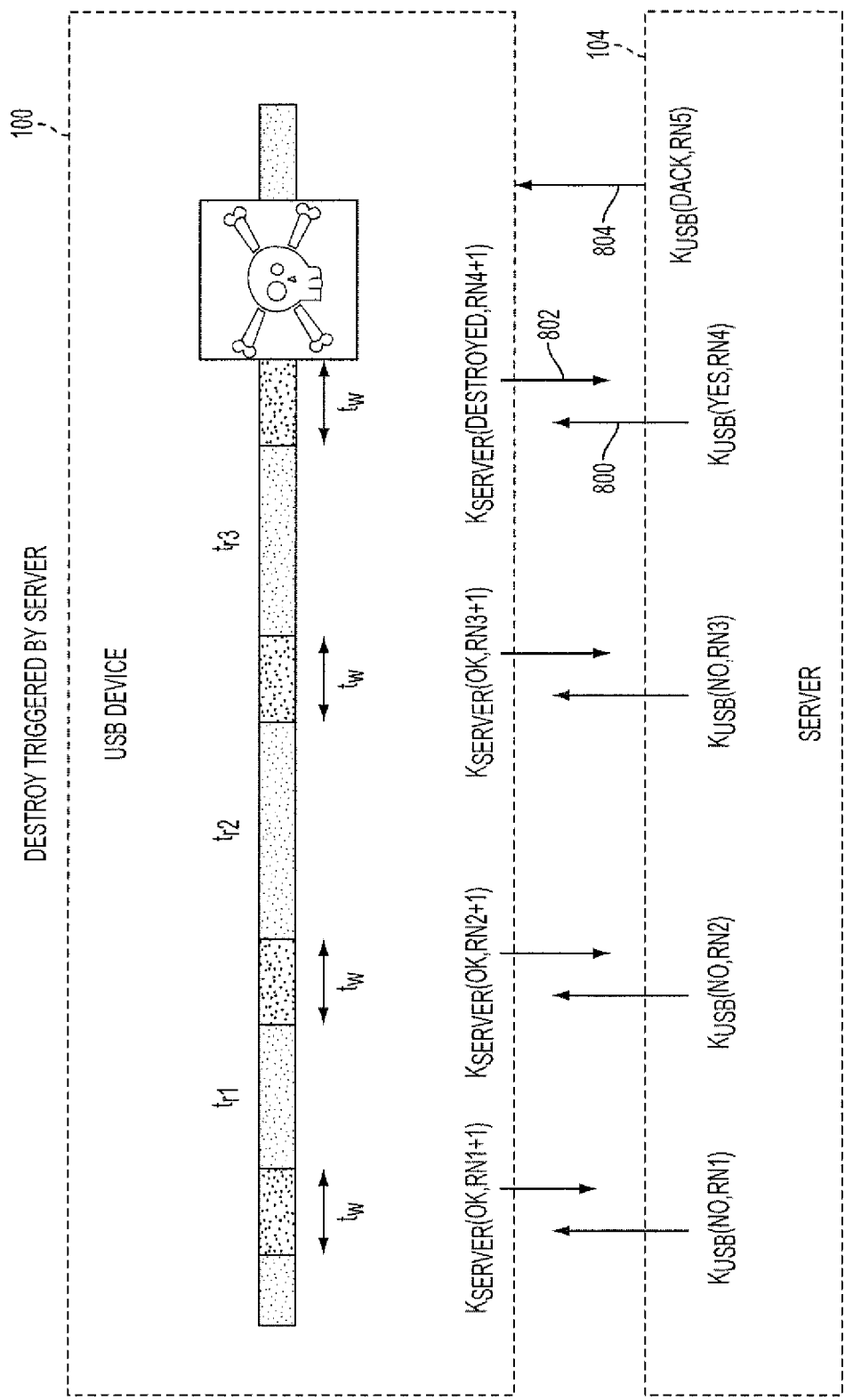

In FIG. 8, at 800, the server 104 activates an additional data protection, for example, activates data destruction, by sending to the USB device 100 a message K with the additional data protection command set to 'YES'. At 802, the USB device 100 executes an additional data protection, for example, destroys target data of the USB device 100 and transmits a message K with the 'Destroyed' notice. At 804, the server 104 transmits to the USB device 100 a Destroyed Acknowledgment (DACK) notice.

Figure 9:
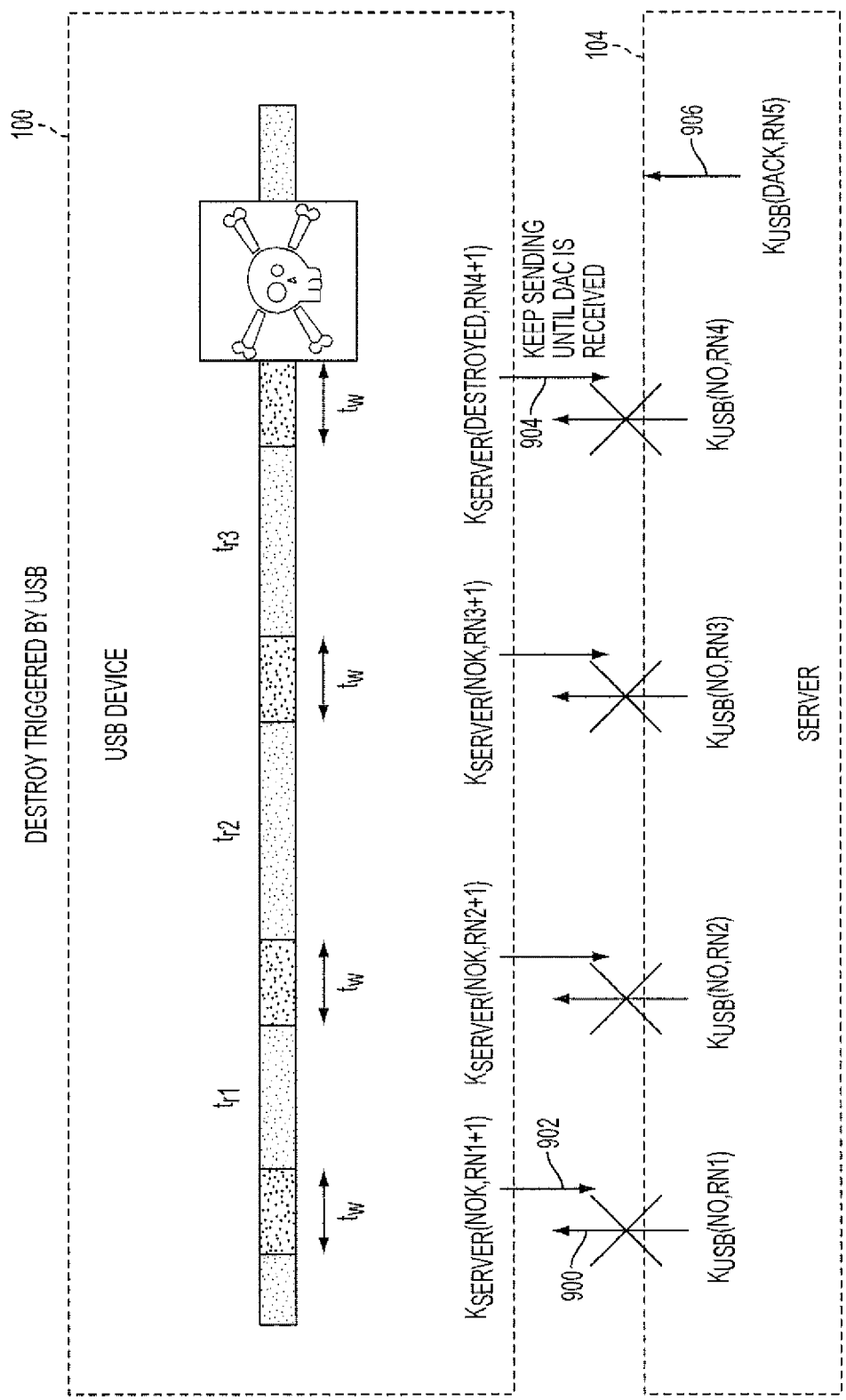

In FIG. 9, the messages K indicating additional data protection is not activated (disabled) are being sent by the server 104 to the USB device 100 during time windows synchronized with the USB device 100, however, the server messages, for example, at 900, are not received by the USB device 100. Therefore, at 902, the USB device 100 detects that a message K has not been received from the server 104 during the time window, so the USB device 100 transmits a message K with a 'Not Ok' notice to the server 104. According to an embodiment, the USB device 100 maintains a history of not receiving a normal security state message during a time window from the server 104 and does not activate an additional data protection until reaching a condition based upon the history. For example, the device 100 after not receiving from the server 104 a message K during respective time windows three consecutive times, at 904, the device 100 activates by itself an additional data protection, for example, triggers destruction of target data of the device 100 and sends a message K with the 'Destroyed' notice to the server 104, for example, until at 906 the device 100 receives a 'Destroyed Acknowledgement (DACK) notice from the server 104.

Figure 10:
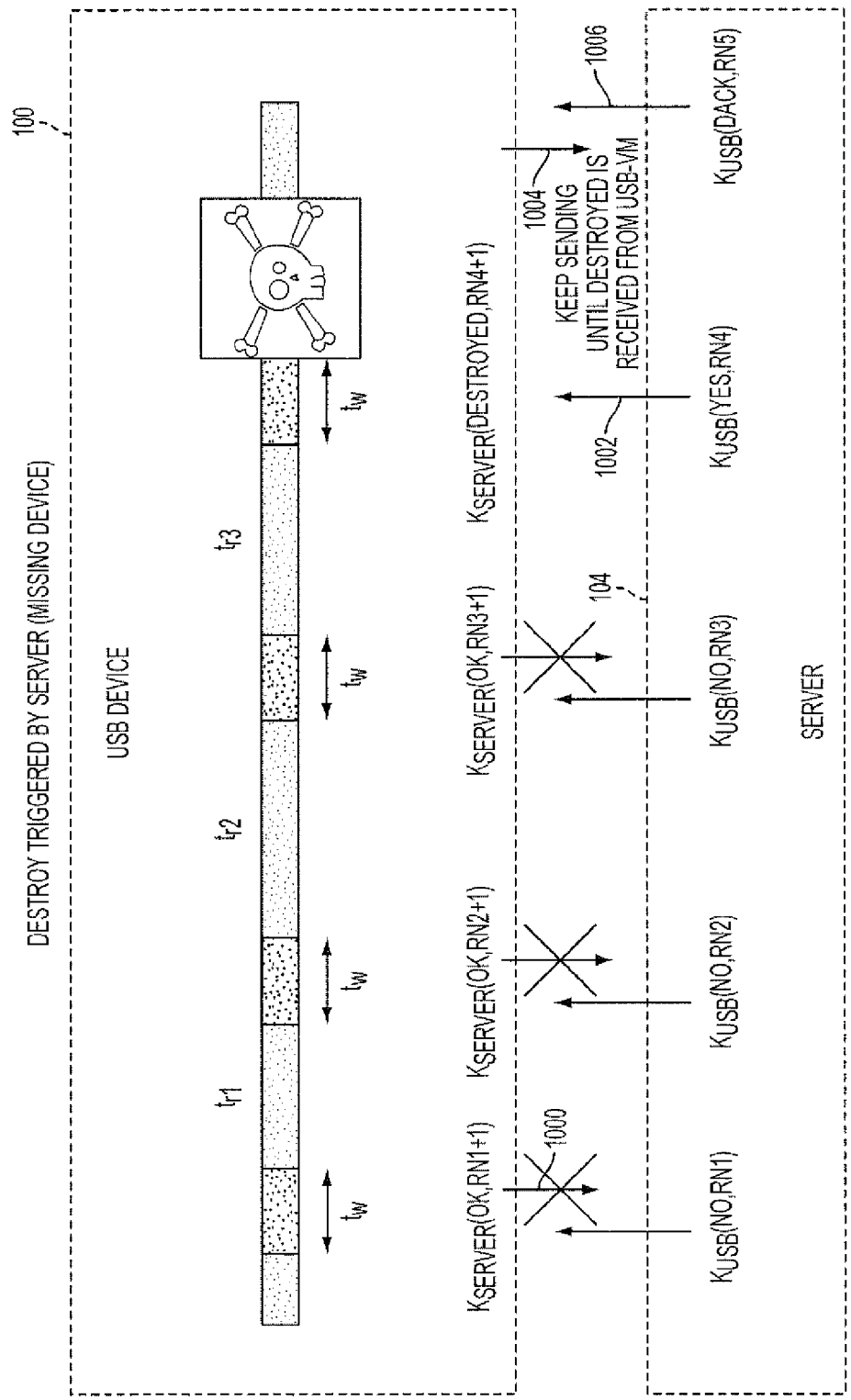

In FIG. 10, the messages K indicating additional data protection is not activated (disabled) are being sent by the server 104 to the USB device 100 during time windows synchronized with the USB device 100, however, while the USB device 100 is receiving the server messages, the device 100 acknowledgment messages to the server 104, for example, at 1000, are not received by the server 104. The server 104 maintains a history of not receiving a normal security state message during a time window from the USB device 100 and does not activate an additional data protection until reaching a condition based upon the history. For example, the server 104 after not receiving from the device 100 a message K indicating a normal security during respective time windows three consecutive times, at 1002, the server 104 activates an additional data protection in the device 100, for example, triggers destruction of target data of the device 100 by sending to the device 100 a message K with the additional data protection command set to 'YES'. The server 104 keeps sending the additional data protection command to the device 100 until at 1004 the server 104 receives a 'Destroyed' notice from the device 100. At 1006, the server 104 can send a message K with 'Destroyed Acknowledgement (DACK) notice to the device 100.

In some cases when the security requirement is low, an alternative mechanism for remote destruction is described: every time when the device 100 is plugged to a PC 102, an inquiry is sent over PC's network to the server 104. If the server 104 returns YES for destruction, the destruction component of the device 100 will be turned on and the report will be sent to the server 104 after the destruction procedure completes; if the server 104 returns NO, users can start to use the device 100; or (in some cases) if the server 104 is unreachable (e.g. the host PC's network function is disabled), the device 100 will be disabled and will not release its content.

Another alternative method does not require any communication between device clients 100 and the remote devices, such as the PC 102 and/or the server 104: before delivering the device 100 to a user, a self-destruction time is set and stored in the device 100. Inside the device 100, there is a clock 229. When the preset self-destruction time is reached, the destruction component of the device 100 will be turned on. Optionally, the self destruction time can be modified when the device 100 receives messages from the remote device 102, 104 about updated self-destruction time before its destruction.

There can be other methods that do not need any communication between device clients 100 and the remote devices 102, 104: a policy is defined and stored in the device 100 before delivery to a user. Any security related mistake (breach and/or attempted breach) a user makes related to the device 100 will be assigned certain points. For example, when the user fails to verify itself in two consecutive occasions: 1 point; when the user tries to use the device 100 in an unauthorized platform: 2 points, and so on. The points will be accumulated and recorded in the device 100. When the total points reach a predefined threshold, the destruction component of the device 100 will be turned on.

Based on applications, these methods might be combined into a specific application oriented remote destruction rule. Example benefits include to securely transport and use confidential data, such as confidential internal or customer data of a company—not just to prevent data leakage, but also to ensure strict accountability in accordance with corporate compliance policies. For example, in case of a USB device, two conditions can be set to be met: 1) in the event the USB device is lost or stolen, the data should not only be encrypted, but should automatically be deleted; and 2) confidential data should be prevented from being copied except on specified USB devices or servers.

Figure 11:
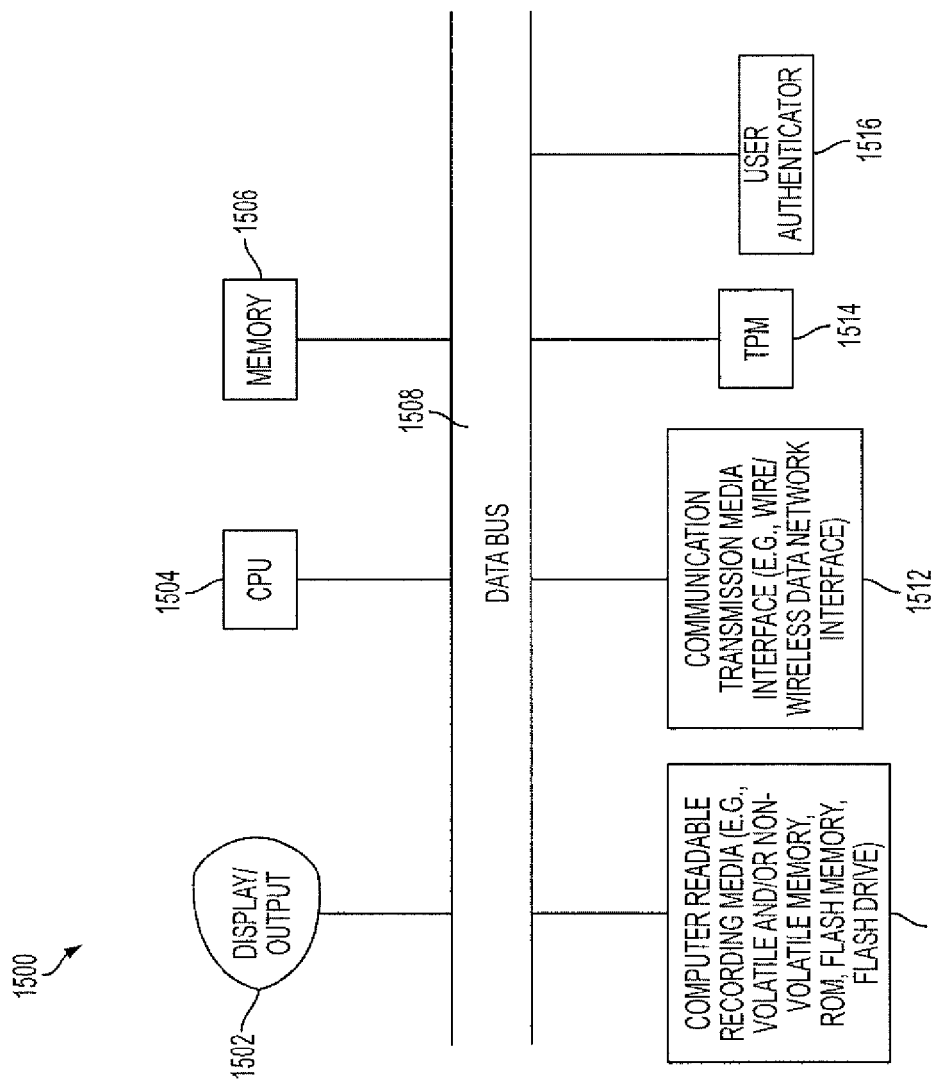
FIG. 11 is a functional block diagram of a computer for the embodiments of the invention.

FIG. 11 is a functional block diagram of a computer for the embodiments of the invention, namely the computer 1500 is an example of a destructible device 100. Further, the computer 1500 can be an example of a personal computer 102 or server 104. In FIG. 15, the computer can be any computing device. Typically, the computer includes a display or output unit 1502 to display a user interface or output information or indications, such as a diode. A computer controller 1504 (e.g., a hardware central processing unit) executes instructions (e.g., a computer program or software) that control the apparatus to perform operations. Typically, a memory 1506 stores the instructions for execution by the controller 1504. A Trusted Platform Module (TPM) 1514 can be provided. According to an aspect of an embodiment, the apparatus reads/writes/processes data of any computer readable media, for example, from computer readable recording media 1510 and/or from communication transmission media interface 1512. The user authenticator 1516 can be fingerprint/palm sensor, or other software/computing hardware for authenticating a user. The display 1502, the CPU 1504 (e.g., hardware logic circuitry based computer processor that processes instructions, namely software), the memory 1506, the computer readable recording media 1510, the communication transmission media interface 1512, TPM 1514 and user authenticator 1516 are in communication by the data bus 1508. Any results produced can be displayed on a display of the computing hardware.

Therefore, according to an aspect of the embodiments of the invention, any combinations of one or more of the described features, functions, operations, and/or benefits can be provided. A combination may include only one or may include two or more. The embodiments can be implemented as an apparatus (a machine) that includes computing hardware (i.e., computing apparatus), such as (in a non-limiting example) any computer that can store, retrieve, process and/or output data and/or communicate (network) with other computers. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM. ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method, comprising:
   checking by a computer for an event condition;
   protecting by the computer target data of the computer in addition to existing data protection on the computer, according to the event condition,
   the checking of the event condition comprises activating the computer with the target data at random time intervals to detect a security check received from a remote computer via a data communication interface and obtaining the event condition from the remote computer,
   the activating to detect the security check received from the remote computer further comprises receiving an encrypted message including a data protection function and a synchronization random number during a time window at the random time intervals, the time window duration to receive the security check from the remote computer being settable according to a policy for increasing or decreasing the encrypted message synchronization between the computer and the remote computer; and
   accumulating a history of failures to obtain the event condition during a set duration of one or more time windows at the random time intervals until reaching a condition to trigger the additionally protecting of the target data.

2. The method according to claim 1, wherein the checking of the event condition further comprises detecting a state of the computer.

3. The method according to claim 2, wherein the event condition obtained from the remote computer comprises one or more of a computer identification (ID), output of a function using a current time and a data protection function for the additionally protecting of the target data on the computer,
   wherein a detected state of the computer triggering the additionally protecting of the target data is according to one or more of a failure to obtain the event condition from the remote computer, verifications of the computer ID and/or the function output or any combinations thereof.

4. The method according to claim 2, wherein a detected state of the computer triggering the additionally protecting of the target data is according to a failure to obtain the event condition from the remote computer, a failure to verify the encrypted message, or a failure to receive a random number in sequence, or any combinations thereof.

5. The method according to claim 2, wherein the state of the computer comprises one or more of a failure based upon user authentication, verification of the computer, verification of a remote computer, physical tempering of the computer, or any combinations thereof, according to a policy.

6. The method according claim 5, further comprising operating at the computer and/or at the remote computer a virtual machine and measuring the virtual machine of the computer and/or the remote computer for verification.

7. The method according to claim 1, wherein the protecting of the target data includes destroying the target data content by erasing the data, invalidating an encryption key to the target data and/or physical destruction.

8. The method according to claim 1, wherein the event condition is a period of time and upon expiration of the time period, the additionally protecting of the target data includes making target data of the computer inaccessible.

9. The method according to claim 1, wherein the event condition includes communicably disconnecting the computer from another computer and the additionally protecting of the target data includes making target data of the computer inaccessible after a period of time from the disconnecting.

10. A computing device communicably connectable to a remote computer, comprising:
    a computer processor that executes
       checking for an event condition;
       protecting target data of the computing device in addition to existing data protection, according to the event condition,
       the checking of the event condition comprises activating the computing device at random time intervals to detect a security check received from the remote computer via a data communication interface and obtaining the event condition from the remote computer,
       the activating to detect the security check received from the remote computer further comprises receiving an encrypted message including a data protection function and a synchronization random number during a time window at the random time intervals, the time window duration to receive the security check from the remote computer being settable according to a policy for increasing or decreasing the encrypted message synchronization between the computing device and the remote computer; and
       accumulating a history of failures to obtain the event condition during a set duration of one or more time windows at the random time intervals until reaching a condition to trigger the additionally protecting of the target data.

11. The computing device according to claim 10, wherein the checking of the event condition further comprises:
    detecting a state of the computing device based upon:
       a failure based upon user authentication, verification of the computing device, verification of the remote computer, physical tempering of the computing device, or any combinations thereof, according to a policy.

12. The computing device according to claim 10, wherein the event condition is a period of time and upon expiration of the time period, the additionally protecting of the target data includes making target data of the computing device inaccessible.

13. The computing device according to claim 10, wherein the event condition includes communicably disconnecting from the remote computer and the additionally protecting of the target data includes making target data of the computing device inaccessible after a period of time from previous communication with the remote computer.

14. The device according to claim 11,
    wherein a detected state of the computing device triggering the additionally protecting of the target data is according to a failure to obtain the event condition from the remote computer, a failure to verify the message, or a failure to receive a random number in sequence, or any combinations thereof.

15. A computer system comprising:

a server computer; and a portable device communicably connectable to the server computer and including a computer processor to execute:

checking for an event condition from the server computer and/or from a state of the portable device;

protecting target data of the portable device in addition to existing data protection, according to the event condition, the checking of the event condition comprises activating the portable device at random time intervals to detect a security check to be received from the server via a data communication interface and obtaining the event condition from the remote computer, the activating to detect the security check received from the server further comprises receiving an encrypted message including a data protection function and a synchronization random number during a time window at the random time intervals, the time window duration to receive the security check from the remote computer being settable according to a policy for increasing or decreasing the encrypted message synchronization between the portable device and the server; and accumulating a history of failures to obtain the event condition during a set duration of one or more time windows at the random time intervals until reaching a condition to trigger the additionally protecting of the target data.

\* \* \* \* \*